(No Model.)
J. G. EBKEN.
RUNNING GEAR FOR VEHICLES.
No. 388,959. Patented Sept. 4, 1888.
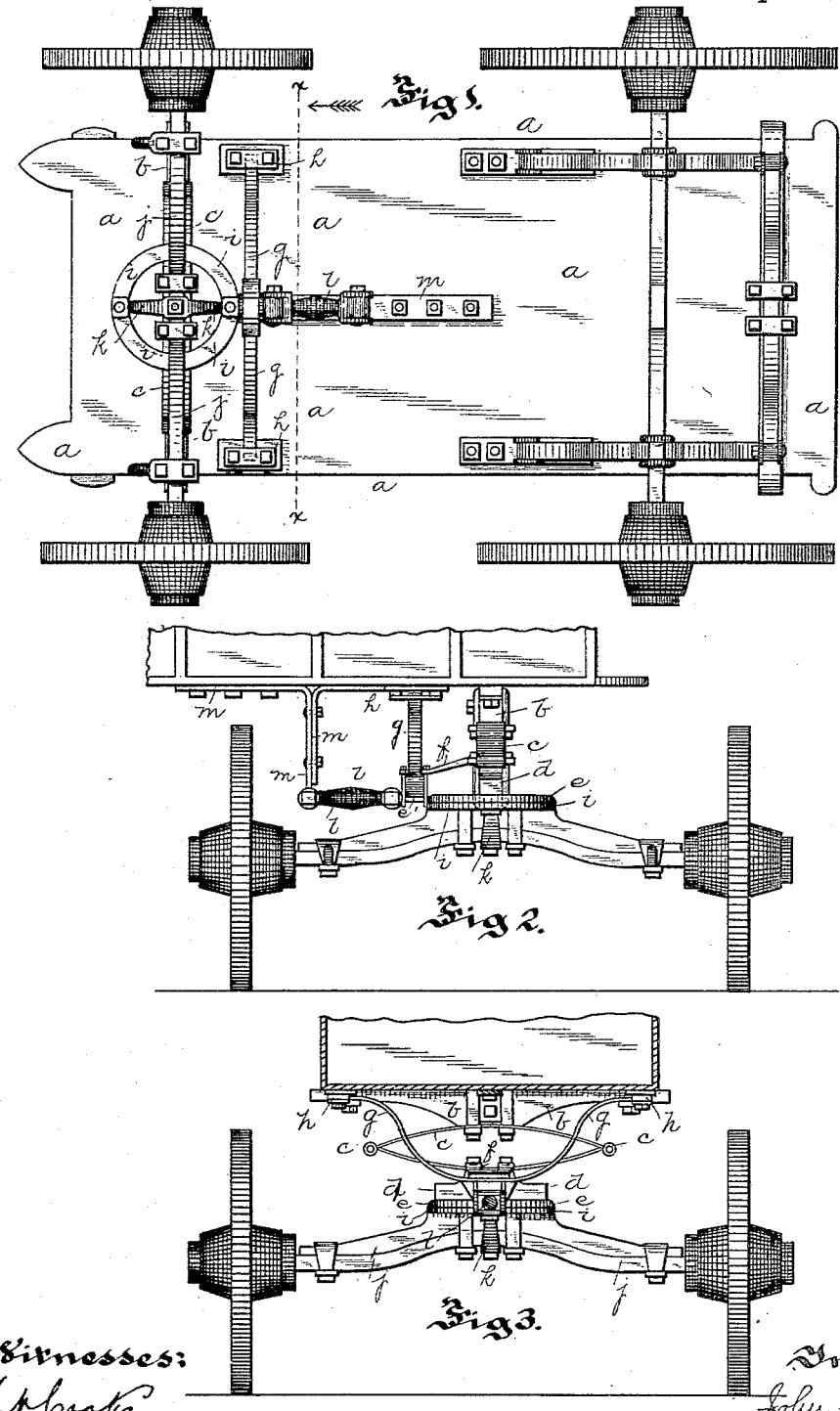

UNITED STATES PATENT OFFICE.

JOHN G. EBKEN, OF PITTSBURG, PENNSYLVANIA.

RUNNING-GEAR FOR VEHICLES.

SPECIFICATION forming part of Letters Patent No. 388,959, dated September 4, 1888.

Application filed September 26, 1887. Serial No. 250,686. (No model.)

*To all whom it may concern:*

Be it known that I, JOHN G. EBKEN, of Pittsburg, in the county of Allegheny and State of Pennsylvania, have invented a new and useful Improvement in Running-Gear for Vehicles; and I do hereby declare the following to be a full, clear, and exact description thereof.

My invention relates to running-gears for vehicles, and more especially to improvements in the form of gear shown and described in patents granted to me December 5, 1882, No. 268,391, and March 23, 1886, No. 338,394. These running-gears are designed to dispense with the reach-rod extending under the body of the vehicle, so that the forward wheels can turn completely under the body of the vehicle, so as to give a very short turn. The form of gear which is shown in the above-mentioned patents not only dispenses with the reach-bar, but also with the heavy platforms which support the fifth-wheels that are usually employed when a reach-bar is not used. This effects a very material reduction in the weight of the vehicle, and also in its cost; but I have found that these gears are deficient in that they do not have sufficient rigidity to resist the tendency of the axle to turn slightly on its axis when it is going over a gutter, crossing, or other obstruction in the roadway, which turning, unless resisted, causes the breaking or distorting of the elliptical spring between the wagon-body and the fifth-wheel, and also the fifth-wheel plates.

The object of my present invention is to overcome this objection and provide a gear in which all tendency to distort the elliptical spring and break or bend the fifth-wheel plates is taken up without affecting the springiness or strength of the vehicle.

To these ends my invention consists, generally stated, in interposing a yielding support between the upper fifth-wheel plate and the body of the vehicle and combining with the same a link or stay rod, which is attached at one end to the fifth-wheel plate and at the other end to a hanger secured to the body of the vehicle; and the invention further consists in certain other improvements, all of which will be more fully hereinafter set forth.

To enable others skilled in the art to make and use my invention, I will describe the same more fully, referring to the accompanying drawings, in which—

Figure 1 is a view of the under side of the wagon with my invention applied thereto; Fig. 2, a side view of the forward part of the same; and Fig. 3, a vertical section on the line $x$ $x$, Fig. 2, looking toward the front end.

Like letters refer to like parts in each of the figures of the drawings.

The wagon-body $a$ has secured to its forward end on the under side the usual spring-bar, $b$, to the lower side of which is secured by suitable clips the upper half of the usual elliptical spring, $c$, the lower half of the same being similarly secured to the head-block $d$. This head-block $d$ has attached to its under side the upper plate or circle, $e$, of the fifth-wheel, which plate has preferably at its rear side a lug or projecting part, $e'$, between which and a rearwardly-projecting arm, $f$, secured to the upper edge of the head-block $d$, is held by suitable clips the middle or the inner ends of a spring or springs, $g$, preferably semi-elliptical or elliptical, the other end of which is secured by suitable clips, $h$, to the wagon-body $a$ or some hanger or projection therefrom. This gives a yielding support to the rear end of the upper circle or plate of the fifth-wheel when any force is thrown upon it which tends to bend it up without in any way destroying or deteriorating the springiness of the vehicle. The upper plate or circle, $e$, rests upon the lower part or turn-plate, $i$, of the fifth-wheel, which is attached to the axle $j$ and braced at its front and rear by stays or struts $k$, projecting from the axle and secured to its outer periphery, so that this turn-plate is firmly braced to support all the weight and strains put upon it. In addition to the bracing of the upper circle or plate, $e$, of the fifth-wheel by the spring $g$, I prefer to secure by a pivot or hinge one end of a link, $l$, to the lug or projection $e'$ of the plate $e$, or some other point thereof, which link is pivoted or hinged at its other end to a hanger, $m$, secured to the under side of the wagon-body. This gives an additional support to the fifth-wheel for the downward thrust on the same, and also resists the tendency of obstructions in the roadway to force the axle backward, which would, unless resisted, tend to bend or break off both the elliptical spring and the fifth-wheel plates. If a vehicle provided with this running-gear strikes an obstruction in the roadway—such as a gutter—the tendency is to force the axle backward and turn it on its axis, this latter tendency being resisted by the yielding support of the spring $g$ and its bending action on both the fifth-wheel plates and the elliptical spring destroyed, while the tendency to force the axle backward is resisted by the link and hanger. Thus both strains are counteracted.

The spring-support for the fifth-wheel plates is preferred, because it not only affords a support for the fifth-wheel plate, which is yielding and will not, therefore, break when a great strain comes upon it, but also affords an additional spring-support for the body of the wagon. If desired, an additional spring may be placed in front of the axle between the upper fifth-wheel plate and the vehicle-body, so as to still further strengthen the running-gear. My improved running gear is very light, easily constructed, and has been found to be very satisfactory in actual use.

Having now described my invention, what I claim is—

1. A running-gear for vehicles, having a spring interposed between the upper fifth-wheel plate and the body of the vehicle, the middle or inner ends of said spring being secured between the fifth-wheel plate and an arm projecting from the head-block, and the other ends of said spring or springs being secured to the vehicle-body, substantially as described.

2. In a running-gear for vehicles, the combination of a spring interposed between the upper fifth-wheel plate and the body of the vehicle, a link or stay rod attached to said fifth-wheel plate, and a hanger secured to the vehicle-body, to which the other end of said link or stay rod is attached, substantially as described.

In testimony whereof I, the said JOHN G. EBKEN, have hereunto set my hand.

JOHN G. EBKEN.

Witnesses:
J. N. COOKE,
N. S. STOCKWELL.